US012670806B1

(12) United States Patent      (10) Patent No.:    US 12,670,806 B1
Strahan et al.                      (45) Date of Patent:        Jun. 30, 2026

(54) MANUAL DEXTERITY TRAINING DEVICE

(71) Applicant: Merry Strahan, Kamas, UT (US)

(72) Inventors: Merry Strahan, Kamas, UT (US);
Ronald Strahan, Kamas, UT (US)

(73) Assignee: Merry Strahan, Kamas, UT (US)

( * ) Notice:    Subject to any disclaimer, the term of this
patent is extended or adjusted under 35
U.S.C. 154(b) by 0 days.

(21) Appl. No.: 19/382,051

(22) Filed:    Nov. 6, 2025

(51) Int. Cl.
*G09B 19/00*        (2006.01)
(52) U.S. Cl.
CPC ................................. *G09B 19/0023* (2013.01)
(58) Field of Classification Search
CPC .................................................. G09B 19/0023
USPC ........................................................ 434/259
See application file for complete search history.

(56)                References Cited

U.S. PATENT DOCUMENTS

| | | | | |
|---|---|---|---|---|
| 4,840,374 | A * | 6/1989 | Skinner | A63F 9/06 |
| | | | | 434/259 |
| 6,290,230 | B1 * | 9/2001 | Anthony | A63F 9/00 |
| | | | | 273/447 |
| 10,914,087 | B1 * | 2/2021 | Kriesel | E04G 23/0214 |
| 11,433,296 | B2 | 9/2022 | Pogosyan | |
| 2011/0133407 | A1 | 6/2011 | Kim et al. | |
| 2014/0070059 | A1 * | 3/2014 | Vieira | A47B 97/00 |
| | | | | 248/122.1 |

FOREIGN PATENT DOCUMENTS

| | | |
|---|---|---|
| RU | 186559 U1 | 1/2019 |
| TW | M480410 U | 6/2014 |
| TW | M645071 U | 8/2023 |

OTHER PUBLICATIONS

Two Shapes Sorting Box. (n.d.). Alison's Montessori | Quality
Montessori Materials. Retrieved Oct. 31, 2025 from https://www.
alisonsmontessori.com/Two_Shapes_Sorting_Box_p/i32.htm?srsltid=
AfmBOooLJRjfGTiQ_2AOSRm38QlyZJVjl2a9lixFZvuFd7Sxj-
mBwKT7.

* cited by examiner

*Primary Examiner* — Xuan M Thai
*Assistant Examiner* — Lisa H Antoine
(74) *Attorney, Agent, or Firm* — Patent Engineering,
LLC; Stephen B. Katsaros

(57)                ABSTRACT

The present disclosure provides a manual dexterity training
device that addresses cognitive and motor skill decline
through progressive therapeutic exercises. The device com-
prises an object configured to be manually moved, and a
container with an open face defining side-A and side-B. A
central vertical divider separates the sides and includes a
protruding section with holes extending through face-A and
face-B. Cover-A and cover-B are hingedly coupled to move
between horizontal and vertical positions, each including
holes for object passage. The device enables objects to move
from side-A to side-B through aligned holes, providing
graduated difficulty levels that help maintain independence
and cognitive function in aging populations and individuals
with neurological conditions.

22 Claims, 10 Drawing Sheets

1100

1200

1300

1400

MANUAL DEXTERITY TRAINING DEVICE

TECHNICAL FIELD

The present disclosure relates to therapeutic devices designed to enhance fine motor skills, hand-eye coordination, and cognitive function, particularly for elderly individuals and those with neurological conditions such as Parkinson's disease, multiple sclerosis, stroke recovery, and cognitive impairment.

BACKGROUND

Manual dexterity and fine motor skills decline with age and neurological conditions, which can significantly impact daily living activities. Traditional rehabilitation approaches often lack engaging, progressive training methods. Therapeutic devices for hand-eye coordination typically focus on developing a single skill rather than improving comprehensive dexterity. Current training tools may not provide adequate difficulty progression or bilateral coordination exercises, which are essential for achieving effective rehabilitation outcomes.

SUMMARY

By 2030, all baby boomers will be older than 65 years, representing 21% of the population. Studies show that the loss of manual dexterity accounts for more than 50% of dependence in aging populations. Manual dexterity training has been successfully used for the treatment and rehabilitation of Parkinson's disease, multiple sclerosis, mild cognitive impairment, strokes, cerebral palsy, Alzheimer's disease, dementia, depression, bipolar mental problems, and children with slow development. The present disclosure addresses these challenges by providing a therapeutic device that combines fine motor skill training with cognitive engagement through progressive exercises designed to maintain independence and improve quality of life.

According to an aspect of the present disclosure, a manual dexterity training device is provided. The device includes an object that defines a shape and size, the object being configured to be manually moved. The device includes a container configured to readily and removably store the object, the container comprising an open face, a side-A, and a side-B, wherein the side-A and side-B are configured to be accessed through the open face. The device includes a central vertical divider positioned within the container and separating the side-A from the side-B, the central vertical divider comprising a face-A adjacent to the side-A of the container, a face-B parallel to and offset from face-A, and face-B adjacent to the side-B of the container, an in-container section, a protruding section adjoining the in-container section and extending from the container adjacent to the open face, and at least a first hole formed in the protruding section and extending through face-A and face-B, the first hole configured to passingly receive the object. The device includes a cover-A hingedly coupled to either the face-A of the central vertical divider or to the container, the cover-A being configured to move between a horizontal position and a vertical position, the cover-A comprising at least a second hole extending through the cover-A and configured to passingly receive the object, wherein the cover-A is coplanar to the open face of the container in the horizontal position, and wherein at the vertical position, the second hole is aligned to the first hole of the central vertical divider. The device includes a cover-B hingedly coupled to either the face-B of the central vertical divider or to the container, the cover-B configured to move between a horizontal position and a vertical position, the cover-B comprising at least a third hole extending through the cover-B and configured to passingly receive the object, wherein the cover-B is coplanar to the open face of the container in the horizontal position, and wherein at the vertical position, the third hole is aligned to the first hole of the central vertical divider, wherein the object is stored in the side-A and readily movable to side-B by passing through the first hole formed in the vertical divider, the second hole formed in the cover-A and the third hole formed in the cover-B.

According to other aspects of the present disclosure, the device may include one or more of the following features. The container may comprise a circular bowl. The central vertical divider may be removably positioned within the container. The central vertical divider may snap into position within the container. The device may further comprise a second object that is larger than the object, and at least a fourth hole (sometimes referred to herein as passageways, e.g. small passageway, a medium passageway, and a large passageway) extending through face-A and face-B of the central vertical divider, the fourth hole configured to passingly receive the second object. The first hole may define a first-hole diameter, and the fourth hole may define a fourth-hole diameter that is larger than the first-hole diameter. The object and the second object may be different marbles. The different marbles may have color-specific sizes. The second hole in the cover-A and the third hole in the cover-B may be color-coded to correspond with the object. The cover-A and the cover-B may be magnetically held in the horizontal position and the vertical position. The device may further comprise a shoulder bracket removably attachable to the central vertical divider, wherein the shoulder bracket is configured to promote shoulder mobility. The device may further comprise sound dampening pads positioned within the container. The container may have a diameter of approximately twelve inches.

According to another aspect of the present disclosure, a method for training manual dexterity is provided. The method comprises providing a manual dexterity training device comprising an object defining a shape and a size, a container configured to readily and removably store the object, the container comprising an open face, a side-A, and a side-B, a central vertical divider positioned within the container and separating the side-A from the side-B, the central vertical divider comprising a face-A, a face-B parallel to and offset from face-A, and at least a first hole extending through face-A and face-B, the first hole sized to passingly receive the object, a cover-A hingedly coupled to either the face-A of the central vertical divider or to the container, the cover-A being configured to move between a horizontal position and a vertical position, the cover-A comprising at least a second hole extending therethrough and sized to passingly receive the object, and a cover-B hingedly coupled to either the face-B of the central vertical divider or to the container, the cover-B configured to move between a horizontal position and a vertical position, the cover-B comprising at least a third hole extending therethrough and sized to passingly receive the object. The method comprises positioning the object in the side-A of the container. The method comprises selecting a skill-level path from a plurality of available skill-level paths for moving the object from the side-A to the side-B. The method comprises moving the object from the side-A to the side-B through the selected skill-level path.

According to other aspects of the present disclosure, the method may include one or more of the following features. The plurality of available skill-level paths may comprise a first skill-level path wherein either the cover-A and the cover-B are positioned in the horizontal position, and the object is moved over the central vertical divider, a second skill-level path wherein the cover-A is positioned in the vertical position with the second hole aligned to the first hole, the cover-B is positioned in the horizontal position, and the object is moved through the second hole and the first hole (alternatively, the cover-A may be in the horizontal position and the cover-B may be in the vertical position), and a third skill-level path wherein both the cover-A and the cover-B are positioned in the vertical position with the second hole and the third hole aligned to the first hole, and the object is moved through the second hole, the first hole, and the third hole. The first skill-level path may provide a beginner difficulty level, the second skill-level path may provide an intermediate difficulty level, and the third skill-level path may provide an advanced difficulty level. The method may further comprise providing a plurality of objects having different sizes, providing a plurality of holes in the central vertical divider, each hole sized to receive objects of different sizes, and selecting objects and corresponding holes to create varying levels of difficulty. The objects may comprise marbles having color-specific sizes, and the method may further comprise selecting marbles based on color to determine the appropriate hole size. The method may further comprise timing the movement of the object from the side-A to the side-B to measure dexterity improvement over multiple training sessions. The method may further comprise progressively increasing the difficulty level by moving from skill-level paths requiring fewer precision movements to skill-level paths requiring more precision movements.

According to another aspect of the present disclosure, a manual dexterity training device is provided. The device comprises a container having an open face and defining a side-A and a side-B. The device comprises a central vertical divider positioned within the container and separating the side-A from the side-B, the central vertical divider comprising a face-A, a face-B parallel to and offset from face-A, and at least one hole extending through the face-A and face-B. The device comprises a cover-A hingedly coupled to the central vertical divider and configured to move between a horizontal position coplanar with the open face and a vertical position, the cover-A comprising at least one hole sized to align with the hole in the central vertical divider when in the vertical position. The device comprises a cover-B hingedly coupled to the central vertical divider and configured to move between a horizontal position coplanar with the open face and a vertical position, the cover-B comprising at least one hole sized to align with the hole in the central vertical divider when in the vertical position, wherein the cover-A and cover-B are independently positionable to create multiple skill-level paths for transferring objects between the side-A and side-B, including a first skill-level path with one of the covers in horizontal positions allowing direct passage over the central vertical divider hole, a second skill-level path with one cover in vertical position and one cover in horizontal position requiring passage through two aligned holes (one formed in the central vertical divider and the other formed in the vertically positioned cover), and a third skill-level path with both covers in vertical positions requiring passage through three aligned holes in sequence.

According to another aspect of the present disclosure, a manual dexterity training device is provided. The device comprises a circular container having an open face and configured to receive objects for dexterity training. The device comprises a central vertical divider removably positioned within the container, the central vertical divider comprising a face-A and a face-B positioned parallel to each other, a plurality of holes extending through both the face-A and the face-B, wherein each hole has a different diameter corresponding to objects of different sizes, and a protruding section extending above the open face of the container. The device comprises a pair of hingedly coupled covers, each cover movable between a horizontal position coplanar with the open face and a vertical position perpendicular to the open face, each cover comprising holes corresponding in size and position to the holes in the central vertical divider. The device comprises a plurality of objects having different sizes, each object sized to pass through a corresponding hole in the central vertical divider and covers, wherein the objects are color-coded according to size, and the holes in the covers are color-coded to match the corresponding objects, wherein the covers are magnetically retained in both the horizontal and vertical positions, wherein the device is configured to provide progressive difficulty levels by selectively positioning the covers to create different skill-level paths for transferring objects between opposite sides of the container.

Further areas of applicability of the present disclosure will become apparent from the detailed description provided hereinafter. It should be understood that the detailed description and specific examples while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than is necessary for a fundamental understanding of the system and the various ways in which it is practiced. The following figures of the drawing include.

5

Figures 9, 10:
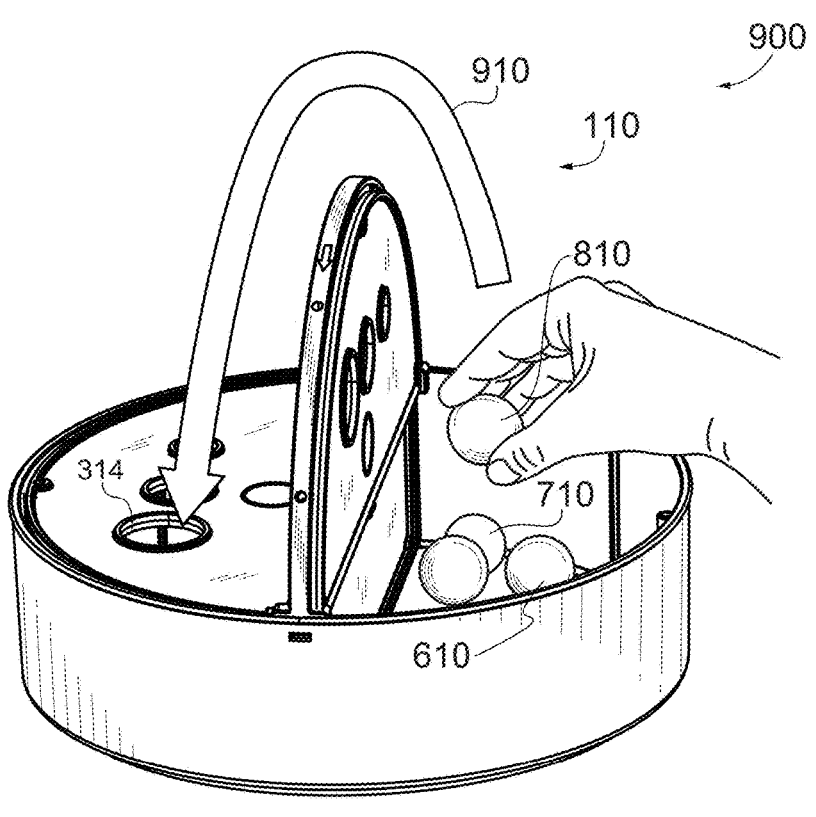

FIG. 9 illustrates a perspective view of an easy path configuration showing the simplest operational setup of the dexterity training device.

FIG. 10 illustrates a perspective view of usage demonstrating an intermediate skill-level path configuration with a marble trajectory.

Figure 11:
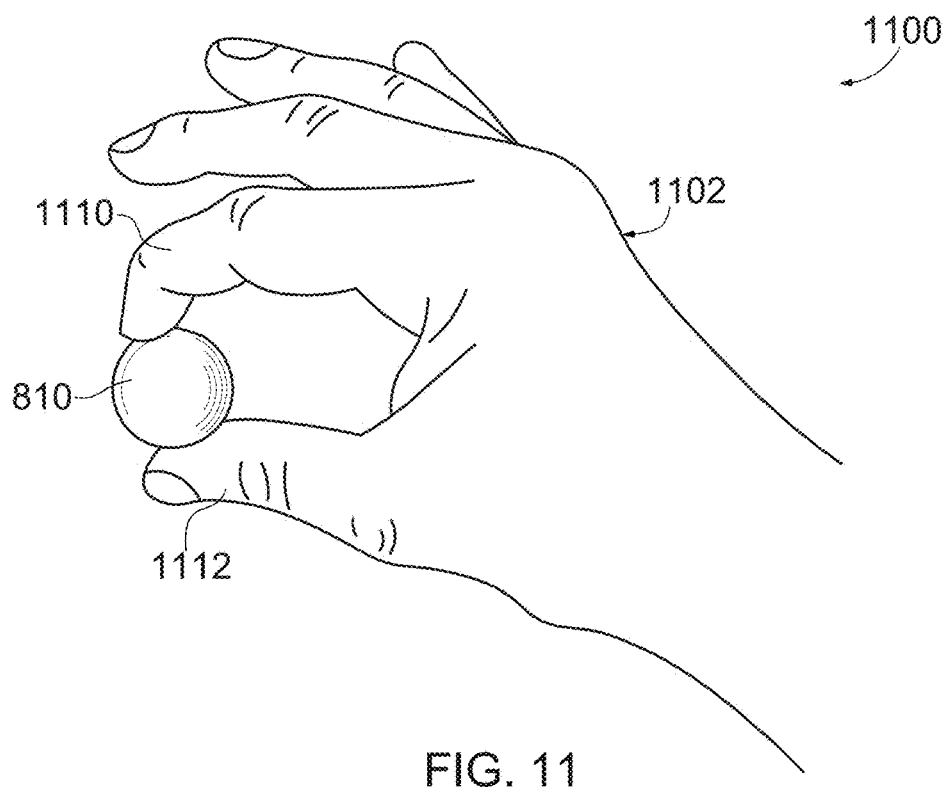

FIG. 11 illustrates a perspective view of first digit utilization showing thumb and index finger coordination for marble manipulation.

Figure 12:
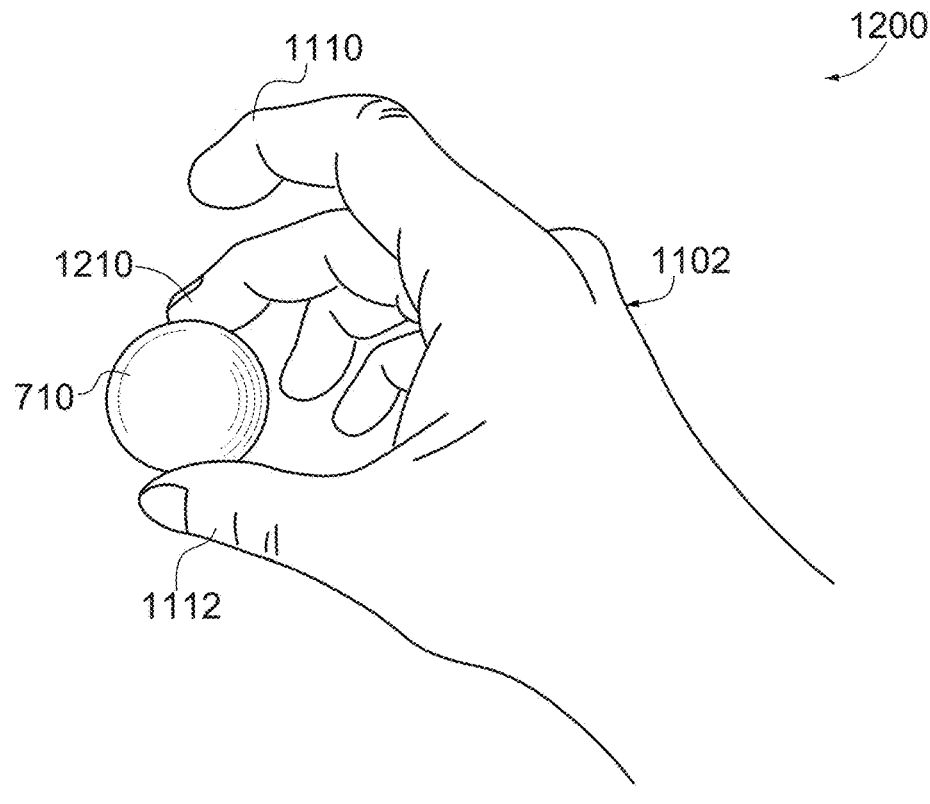

FIG. 12 illustrates a perspective view of second digit utilization showing thumb and middle finger coordination for marble manipulation.

Figure 13:
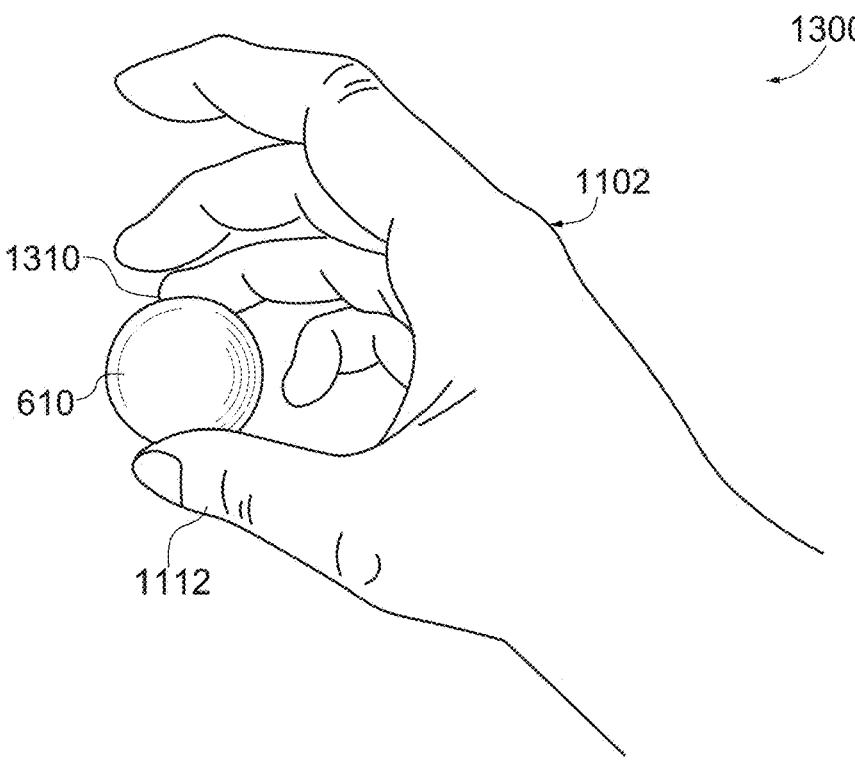

FIG. 13 illustrates a perspective view of third digit utilization showing thumb and ring finger coordination for marble manipulation.

Figure 14:
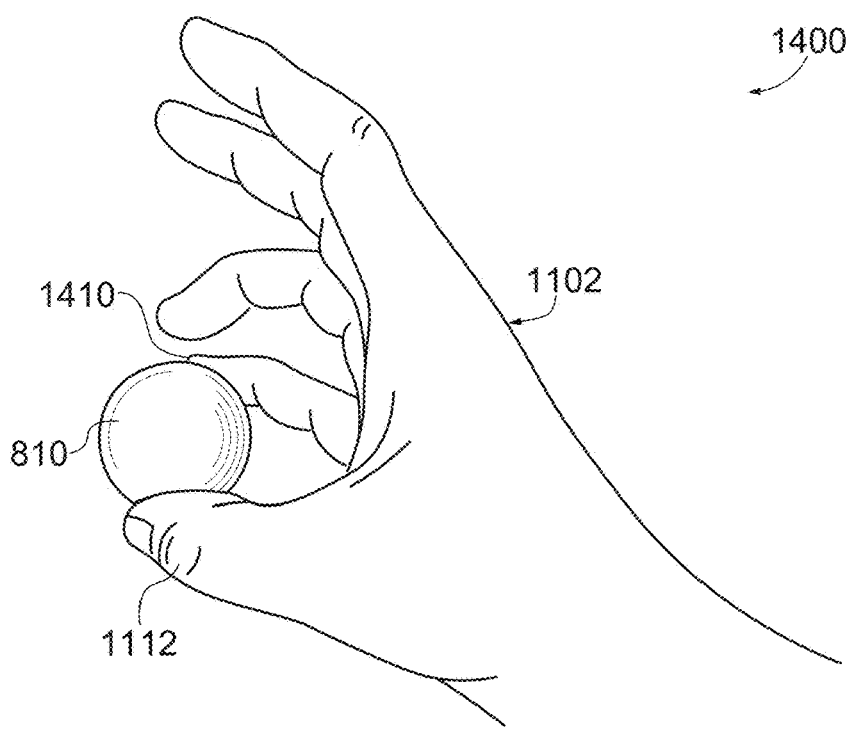

FIG. 14 illustrates a perspective view of fourth digit utilization showing thumb and pinky finger coordination for marble manipulation.

Figure 15:
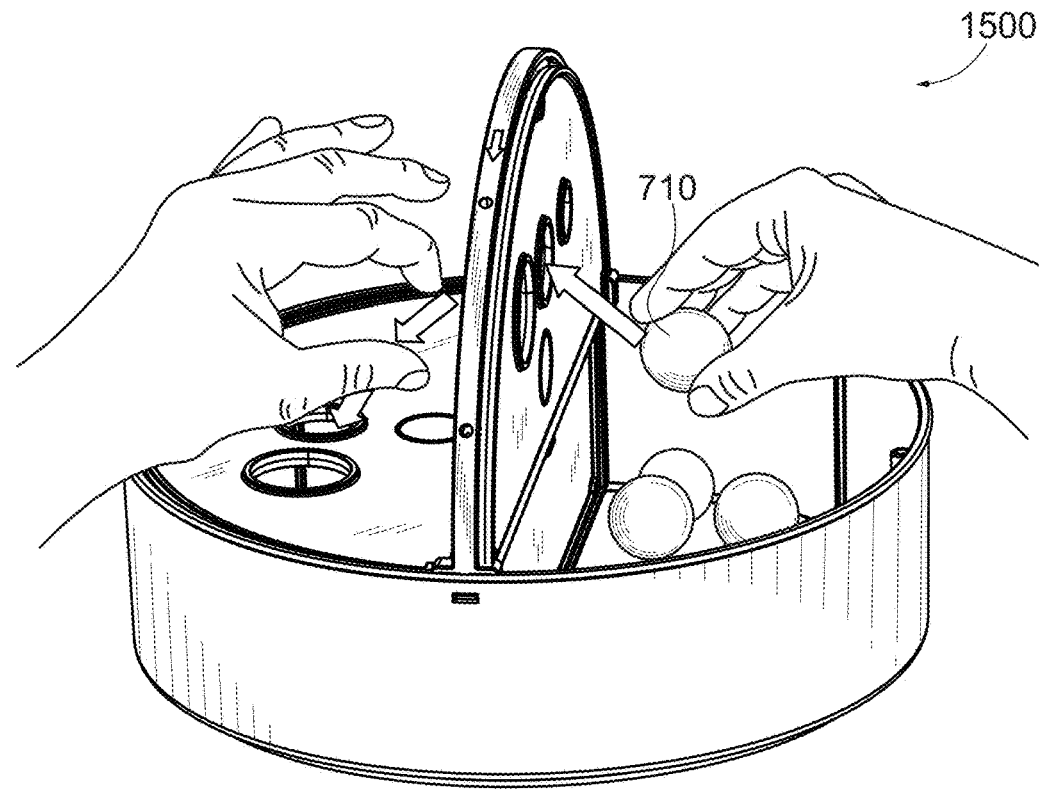

FIG. 15 illustrates a perspective view of challenging utilization demonstrating bilateral coordination training with simultaneous hand movements.

Figure 16:
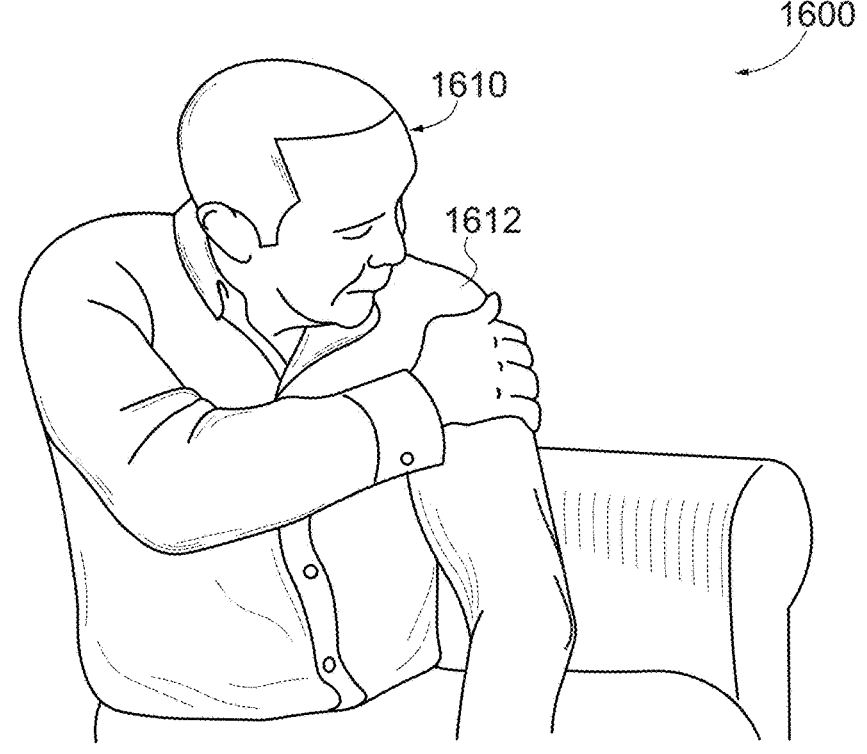

FIG. 16 illustrates a perspective view of shoulder pain showing a user with shoulder-related conditions requiring therapeutic intervention.

Figure 17:
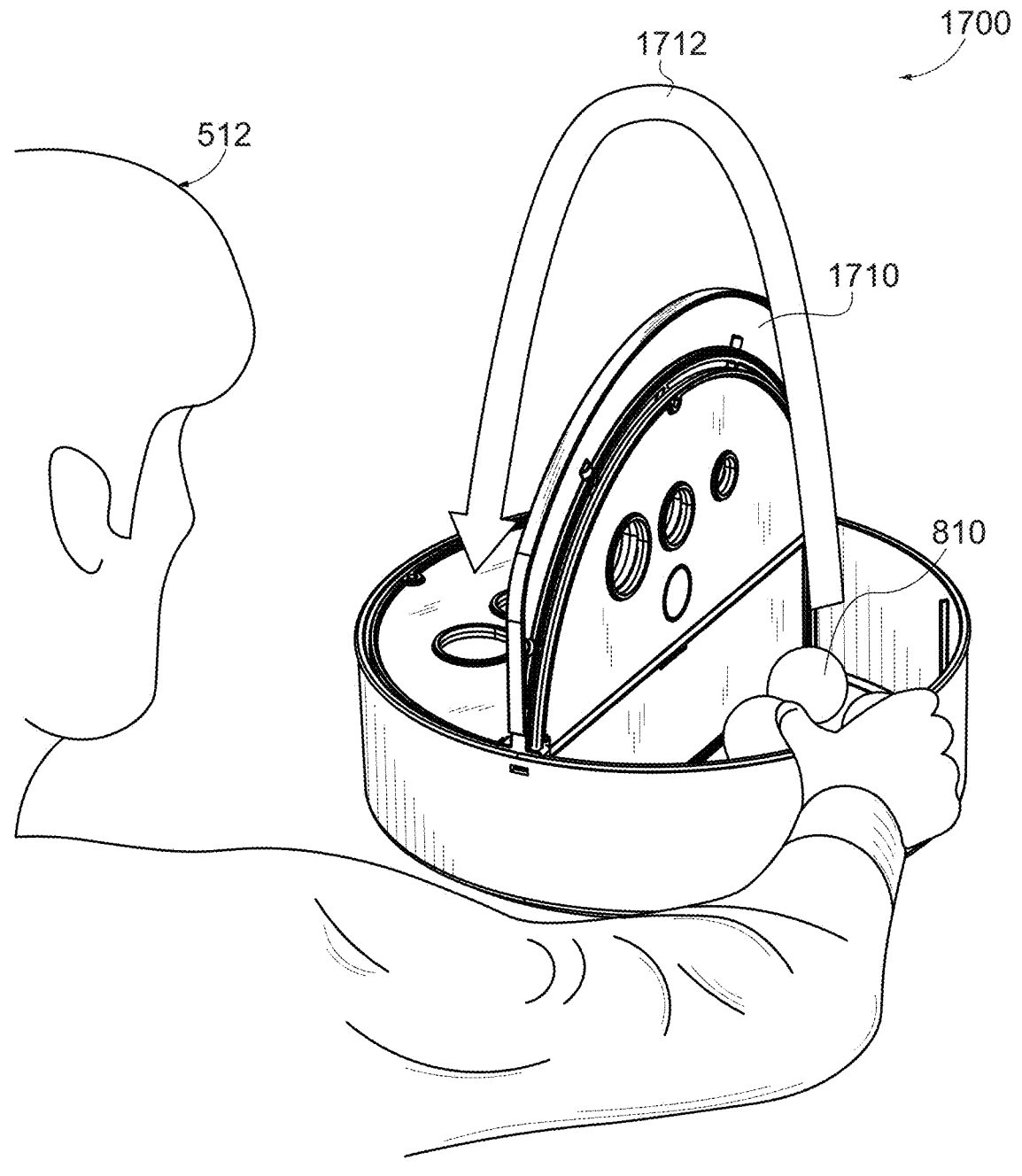

FIG. 17 illustrates a perspective view of shoulder training showing the dexterity training device with an optional shoulder bracket for enhanced therapeutic functionality.

In the appended figures, similar components and/or features may have the same reference label. Further, various components of the same type may be distinguished by following the reference label with a dash and a second label that distinguishes among the similar components. If only the first reference label is used in the specification, the description applies to any one of the similar components having the same first reference label, irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered exemplary only, with the true scope and spirit being indicated by the following claims.

Declining manual dexterity and fine motor skills represent significant challenges associated with aging and various neurological conditions, creating substantial barriers to performing essential daily living activities and maintaining personal independence. This deterioration has profound medical significance as it directly impacts an individual's ability to perform basic tasks such as writing, buttoning clothes, grasping small objects, or coordinating bilateral hand movements, ultimately affecting overall quality of life and autonomy. The loss of fine motor control may result from neurological damage, muscle weakness, reduced coordination, or cognitive decline, leading to decreased confidence and increased dependence on caregivers. The presently disclosed manual dexterity training device addresses these therapeutic needs by providing a targeted solution for elderly individuals and patients suffering from neurological conditions, including Parkinson's disease, multiple sclerosis, stroke recovery, and cognitive impairment. The device may be particularly important for maintaining independence and improving quality of life through progressive, engaging training methods that can be adapted to individual skill levels and therapeutic requirements. The disclosed device may offer structured rehabilitation exercises that target specific finger combinations, hand-eye coordination, and bilateral coordination skills through graduated difficulty levels, providing measurable improvement opportunities for those seeking to preserve or regain their fine motor capabilities while supporting cognitive function through coordinated motor learning exercises.

Figure 1:
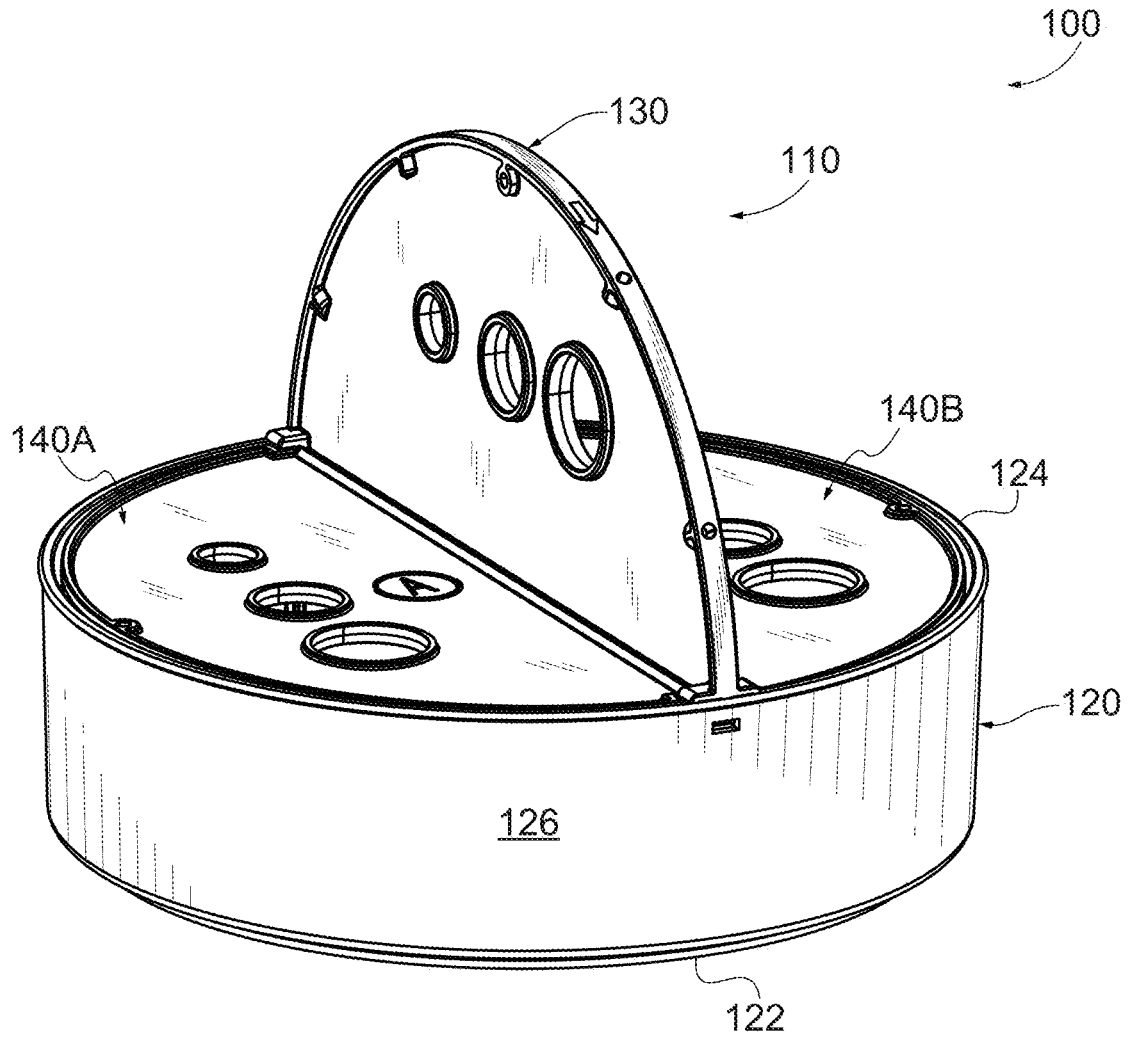
FIG. 1 illustrates a front perspective view of a dexterity training device with a container and central vertical divider.

FIG. 1 illustrates a front perspective view 100 of a dexterity training device 110 configured to address the challenges associated with declining fine motor skills and hand-eye coordination that commonly affect aging populations and individuals with neurological conditions. The dexterity training device 110 may provide a structured approach to maintaining and improving manual dexterity through progressive exercises that engage multiple aspects of fine motor control, including finger coordination, wrist movement, and shoulder engagement.

The dexterity training device 110 includes a container 120 that may be specifically configured as a circular bowl with a diameter of approximately twelve inches. The container 120 includes a bottom 122 that provides a stable foundation for the device during use. A perimeter 126 adjoins the bottom 122 and extends upward to define the structural boundaries of the container 120. An open face 124 may be positioned at the top of the container 120, providing access to the interior space where objects can be stored and manipulated during training exercises. The circular configuration of the container 120 may create angular challenges that differ from traditional rectangular training devices, thereby enhancing the complexity and effectiveness of dexterity exercises.

A central vertical divider 130 may be positioned within the container 120 and configured to separate the interior space into distinct training areas. The central vertical divider 130 may include an in-container section that fits within the boundaries of the container 120 and a protruding section that extends above the open face 124. The central vertical divider 130 may include a face-A adjacent to a side-A of the container 120 and a face-B that may be positioned parallel to and offset from the face-A, with the face-B being adjacent to a side-B of the container 120. The central vertical divider 130 may be removably positioned within the container 120, allowing for convenient storage and transportation of the device. Additionally, the central vertical divider 130 may include one or more holes formed in the protruding section that extend through both the face-A and face-B, with each hole configured to receive objects of specific sizes during training exercises passingly.

In an illustrative configuration, the dexterity training device 110 may include a cover-A 140A that may be hingedly coupled to either the face-A of the central vertical divider 130 or directly to the container 120. The cover-A 140A may be configured to move between a horizontal position and a vertical position, providing variable access configurations for training exercises. When positioned horizontally, the cover-A 140A may be coplanar to the open face 124 of the container 120, creating an accessible surface for object placement and retrieval. The cover-A 140A may include one or more holes extending through the cover structure, with each hole configured to passingly receive objects during training exercises. When the cover-A 140A may be positioned vertically, the holes in the cover-A 140A may align with corresponding holes in the central vertical divider 130, creating defined pathways for object transfer between the side-A and side-B of the container 120.

Similarly, a cover-B 140B may be hingedly coupled to either the face-B of the central vertical divider 130 or to the container 120. The cover-B 140B may be configured to move between a horizontal position and a vertical position, mirroring the functionality of the cover-A 140A. When positioned horizontally, the cover-B 140B may be coplanar to the open face 124 of the container 120. The cover-B 140B may include holes that correspond in size and position to the holes in the central vertical divider 130 and cover-A 140A. When positioned vertically, the holes in the cover-B 140B may align with the holes in the central vertical divider 130, creating continuous pathways for object passage. During storage and transportation, both the cover-A 140A and cover-B 140B may be positioned in the horizontal position for compact storage. During use, one of the covers may be positioned in the horizontal position while the other is positioned in the vertical position, creating multiple skill-level paths for transferring objects between different sections of the container 120, allowing users to progress through varying levels of difficulty as their dexterity improves.

The configuration of the dexterity training device 110 may enable objects to be stored in the side-A of the container 120 and readily moved to the side-B through various pathways created by the positioning of the covers and the holes in the central vertical divider 130. The device may provide a first skill-level path with one cover in horizontal position and one cover in vertical position, allowing travel over the top of the central vertical divider 130. Another skill-level path, sometimes referred to as a second skill-level path, may be created with the covers in opposite vertical/horizontal positions, requiring passage through the central vertical divider hole and the other aligned cover hole. Yet another skill-level path may involve the covers in opposite vertical/horizontal positions, requiring passage through (for example) three aligned holes in sequence, thereby providing the highest level of difficulty and precision training.

Figure 2:
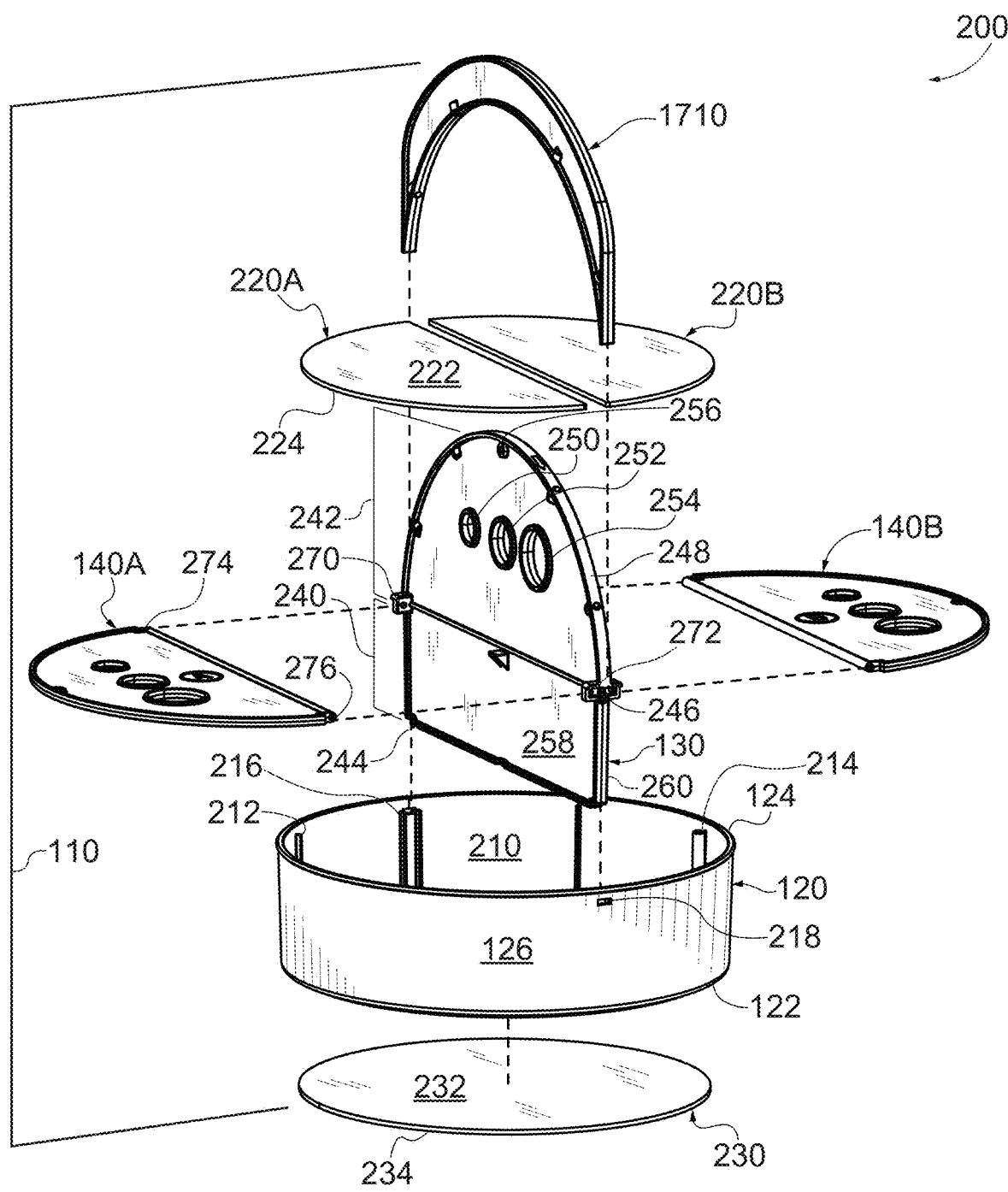
FIG. 2 illustrates an exploded perspective view of the manual dexterity training device showing internal components and assembly configuration.

FIG. 2 illustrates a perspective view in an exploded condition with an optional feature 200 of the dexterity training device 110, revealing the internal components and assembly configuration. The container 120 includes an interior 210 that houses various structural and functional elements designed to support the therapeutic operation of the device. A rib 212 may be positioned within the interior 210 to provide structural reinforcement, while a magnet bracket 214 may be integrated to support magnetic retention components. The interior 210 may also include a partition track 216 that facilitates the installation and positioning of the central vertical divider 130. Additionally, a detent opening 218 may be formed within the container 120 to receive and secure positioning elements during assembly. All of these features are provided for logistics benefit (shippable) and/or storage purposes either for initial distribution or long-term use conditions.

The device 110 may include sound dampening components to minimize auditory disturbances during therapeutic exercises. A sound dampening pad 220A and a sound dampening pad 220B may be positioned within the interior 210 of the container 120. The sound dampening pad 220A may include a top face 222 and a bottom face 224, where the bottom face 224 can be adhered to the container 120 using an adhesive layer. The sound dampening pads 220A and 220B may be specifically positioned to attenuate the sound generated when objects, such as marbles, impact the container 120 during dexterity training exercises. The strategic placement of these sound dampening elements may enhance the user experience by reducing noise levels that could be distracting during therapeutic sessions. The sound dampening pads 220A and 220B may be constructed from various materials that provide effective acoustic attenuation while maintaining durability during repeated use. In some configurations, the sound dampening pads may be fabricated from closed-cell foam materials such as neoprene or EPDM rubber, which may exhibit durometer ratings ranging from Shore A 20 to Shore A 60, providing optimal balance between sound absorption and structural integrity. The pads may alternatively be formed from polyurethane foam sheets with densities between 1.5 to 4.0 pounds per cubic foot, offering excellent sound dampening characteristics while remaining lightweight and cost-effective. In some cases, the sound dampening pads may incorporate viscoelastic materials such as butyl rubber or specialized acoustic foam composites that demonstrate superior vibration dampening properties. The materials may be available in sheet form with thicknesses ranging from $\frac{1}{8}$ inch to $\frac{1}{2}$ inch, allowing for customization based on specific acoustic requirements and container dimensions. Additionally, the sound dampening materials may feature adhesive backing layers or pressure-sensitive adhesives that facilitate secure attachment to the container surfaces while, in one configuration, maintaining removability for cleaning or replacement purposes.

The device 110 may further include stability features to maintain proper positioning during use. A traction pad 230 may be provided with a top face 232 and a bottom face 234, where the traction pad 230 can retain the position of the device 110 relative to a worksurface upon which the device 110 is supported. The traction pad 230 may be one of three rubber traction pads positioned on the bottom of the container 120 to prevent sliding during therapeutic exercises. The traction pads may provide sufficient grip to maintain device stability while allowing users to perform various dexterity training movements without concern for device displacement.

In an illustrative configuration, the central vertical divider 130 may include multiple structural components that facilitate both installation and operation. The central vertical divider 130 may include a container portion 240 and a protruding portion 242, where the protruding portion 242 extends beyond the open face 124 of the container 120. A first rail 244 may be integrated into the central vertical divider 130, along with a detent clip 246 that engages with the detent opening 218 in the container 120. The central vertical divider 130 may also include a divider edge 248 that facilitates the clipping or snapping of the central vertical divider 130 into the container 120. This snap-in mechanism may allow the central vertical divider 130 to be permanently installed in the container 120 with a one-time snap connection, providing secure positioning while maintaining the structural integrity of the device 110.

The central vertical divider 130 may include multiple passageways designed to accommodate objects of varying sizes during therapeutic exercises. A small passageway 250, a medium passageway 252, and a large passageway 254 may extend through the central vertical divider 130. These passageways 250, 252, 254 may be color coded to match aesthetic properties, such as color, texture, or durometer, of objects being passed therethrough, such as glass marbles that have color-specific sizes. The passageways may provide graduated difficulty levels for users, allowing progression from larger, easier-to-manipulate objects to smaller objects that require greater dexterity and precision.

The central vertical divider 130 may also include magnetic retention features to support the positioning of covers and other components. One or more magnet holes 256 may be formed in the central vertical divider 130 for receiving magnets of a magnet pair, or a magnet and a steel object. The magnet holes 256 may include small vent holes to allow air to escape and prevent the magnets from being pushed out during installation. The device 110 may include many (e.g. fourteen) magnets positioned throughout the structure to hold the covers in both horizontal and vertical positions, providing reliable positioning while allowing smooth transitions between configurations.

In an illustrative configuration, the central vertical divider 130 may include distinct faces that interface with different sections of the container 120. A face-A 258 may be positioned adjacent to the side-A of the container 120, while a face-B 260 may be positioned parallel to and offset from the face-A 258, with the face-B 260 being adjacent to the side-B of the container 120. The faces 258, 260 may provide mounting surfaces for covers and other components, while also defining the boundaries between different sections of the therapeutic device 110. Various openings discussed later herein may extend through the central vertical divider 130, providing structural configuration while maintaining the functional separation between container sections.

The device 110 may include an optional shoulder bracket 1710 that can be removably attached to the central vertical divider 130 to provide enhanced therapeutic functionality. The shoulder bracket 1710 may be configured to promote shoulder mobility by increasing the height over which objects must be passed, thereby engaging shoulder muscles more extensively during therapeutic exercises. The shoulder bracket 1710 may be particularly beneficial for users recovering from shoulder surgery or those seeking to maintain or improve shoulder mobility and strength.

The covers of the device 110 may include sophisticated hinge mechanisms that allow precise positioning and reliable operation. The cover-A 140A and the cover-B 140B may, in one configuration, be substantially identical components, and therefore a description of the cover-A 140A may be sufficient to describe the cover-B 140B. The cover-A 140A may be hingedly attached to either the container 120 or the central vertical divider 130, such as through a configuration where a first hinge hole 270 and a second hinge hole 272 are formed on the face-A 258 of the central vertical divider 130. A first hinge pin 274 and a second hinge pin 276 may be formed in the cover-A 140A and may interface with the first hinge hole 270 and the second hinge hole 272, respectively. This hinge configuration may allow the covers to move smoothly between horizontal and vertical positions while maintaining proper alignment with the passageways in the central vertical divider 130, thereby supporting the various therapeutic exercise configurations disclosed herein. In some configuration, the covers (e.g. cover-A 140A and cover-B 140B) may be attached by other mechanisms ranging from a living hinge (compliant plastic), to a dowel hinge, to a fabric strip, etc.

Figure 3:
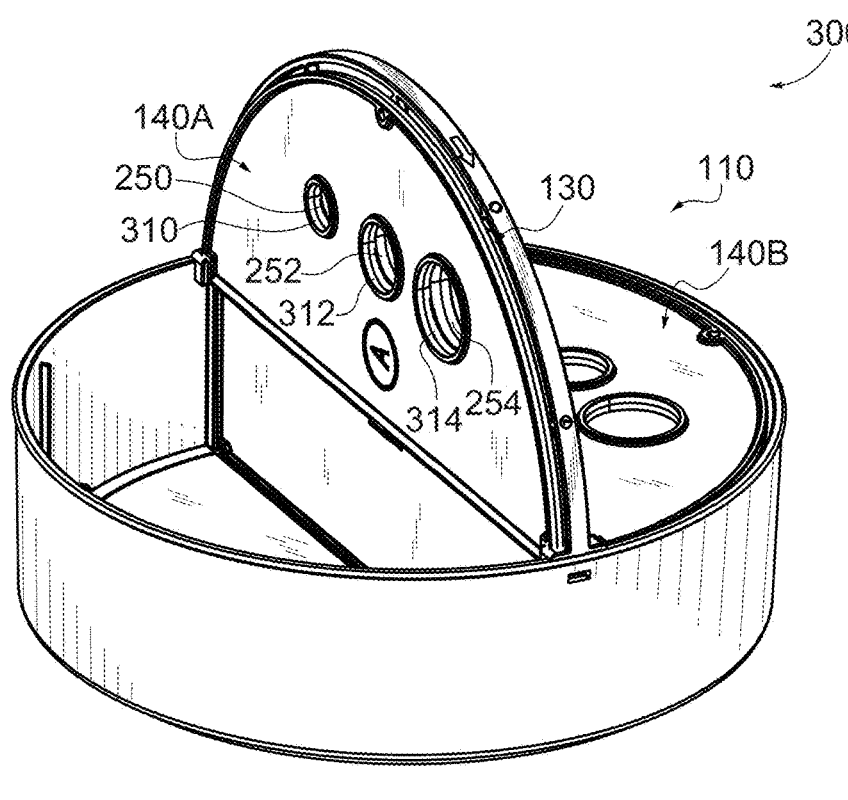
FIG. 3 illustrates a perspective view of the dexterity training device in use condition, featuring multiple passageways and corresponding holes.

FIG. 3 illustrates a perspective view in a use condition 300 of the dexterity training device 110, showing the central vertical divider 130 positioned within the container 120. The central vertical divider 130 may include multiple passageways that extend through the structure to facilitate object transfer during therapeutic training exercises. In this illustrative configuration, the central vertical divider 130 may include a small passageway 250, a medium passageway 252, and a large passageway 254, each configured to accommodate objects of different sizes. The passageways may be arranged in a progressive sizing system that enables users to engage in dexterity training at varying difficulty levels, with smaller passageways presenting greater challenges for fine motor skill development. Additionally, the passageways may be formed of varying shapes.

The progressive sizing system disclosed in the central vertical divider 130 may correspond to holes formed in the covers of the device. As shown in FIG. 3, the cover-A 140A and cover-B 140B may include a small hole 310, a medium hole 312, and a large hole 314 that align with the respective passageways in the central vertical divider 130. The small hole 310 may be configured to align with the small passageway 250, while the medium hole 312 may align with the medium passageway 252, and the large hole 314 may align with the large passageway 254. This alignment system may enable objects to pass through the central vertical divider 130 when the covers are positioned in their vertical positions, creating controlled pathways for therapeutic exercises.

Additionally, the passageways and corresponding holes may be color-coded to support cognitive engagement during training sessions. The color-coding system may provide visual cues that help users identify appropriate object-to-hole pairings, thereby combining cognitive processing with motor skill development. In an illustrative configuration, the device may include a second object that is larger than a first object, with the central vertical divider 130 including at least a fourth hole extending ((for example small passageway 250, medium passageway 252, and a large passageway 254)) through face-A 258 and face-B 260, where the fourth hole may be configured to passingly receive the second object. The first hole may define a first-hole diameter, while the fourth hole may define a fourth-hole diameter that is larger than the first-hole diameter, enabling the progressive difficulty system. The objects may be different marbles with varying sizes, allowing users to advance through increasingly challenging exercises as their dexterity improves.

Figure 4:
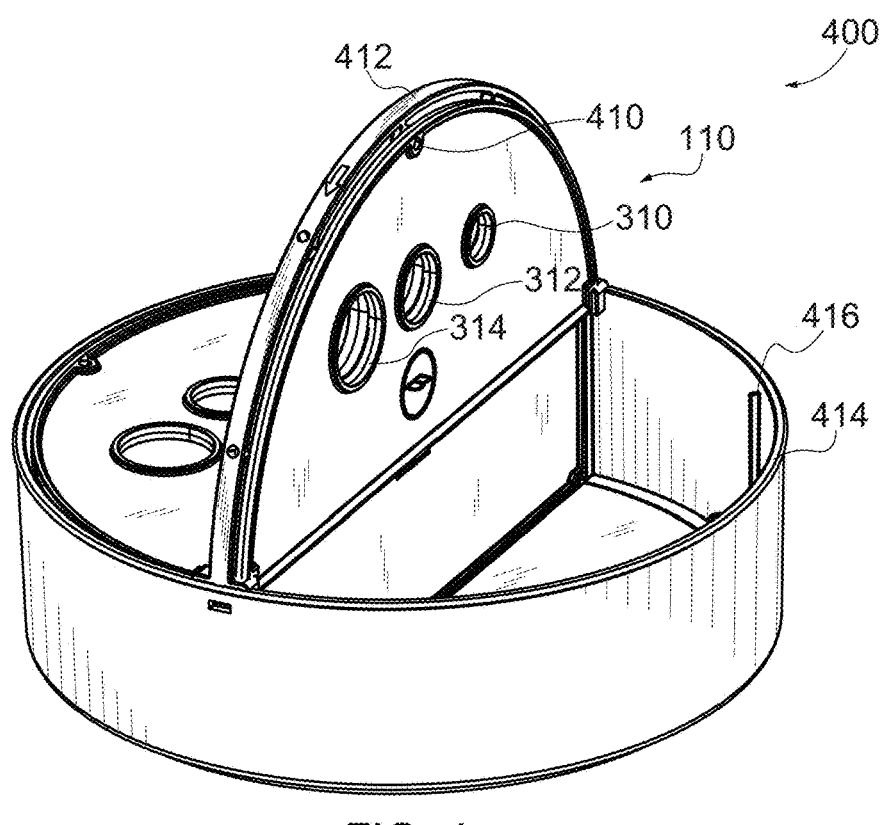
FIG. 4 illustrates a perspective view of the dexterity training device wherein one side of the container is accessible, showing alignment and retention mechanisms.

FIG. 4 illustrates a perspective view wherein one side of the container is accessible 400 of a dexterity training device 110, showing the detailed alignment and retention mechanisms that enable precise therapeutic functionality. The device 110 includes a series of holes of varying sizes: the small hole 310, the medium hole 312, and the large hole 314, which may be configured to correspond directly with the passageways in the central vertical divider 130. The holes in cover-A 140A and cover-B 140B may be precisely sized and positioned to align with the small passageway 250, medium passageway 252, and large passageway 254 (sometimes referred to herein as a hole, specifically a fourth hole) respectively when the covers are positioned vertically. This alignment configuration may enable objects to pass seamlessly through the combined pathway formed by the cover holes and divider passageways during dexterity training exercises.

The magnetic retention system disclosed in the device 110 includes multiple magnets strategically positioned to secure the covers in both operational positions. A magnet 410 may be positioned within the structure to provide magnetic attraction for holding cover-A 140A in the horizontal position. Additionally, a magnet 412 may be configured to secure the cover in the vertical position, while a magnet 414 may provide additional retention force for stable positioning during use. The magnets 410, 412, 414 may create sufficient holding force to maintain cover positions during object manipulation while allowing users to easily reposition the covers as needed for different skill-level exercises.

In an illustrative configuration, the holes in the covers may be color-coded to correspond with the objects used in training exercises. The second hole in the cover-A 140A and the third hole in the cover-B 140B may be color-coded to correspond with the object being passed through the device 110. This color-coding system may facilitate proper object-to-hole matching and may enhance the cognitive training aspects of the dexterity exercises by requiring users to visually identify and match colored objects with corresponding colored holes.

A support rib 416 may be incorporated into the design to provide structural reinforcement when cover-B 140B is positioned horizontally. The support rib 416 may distribute loads and prevent flexing or deformation of the cover during therapeutic use, ensuring consistent hole alignment and stable operation throughout extended training sessions. The cover-A 140A and the cover-B 140B may be magnetically held in the horizontal position and the vertical position through the coordinated action of the magnets 410, 412, 414, providing reliable positioning for users with varying levels of motor control and strength.

Figure 5:
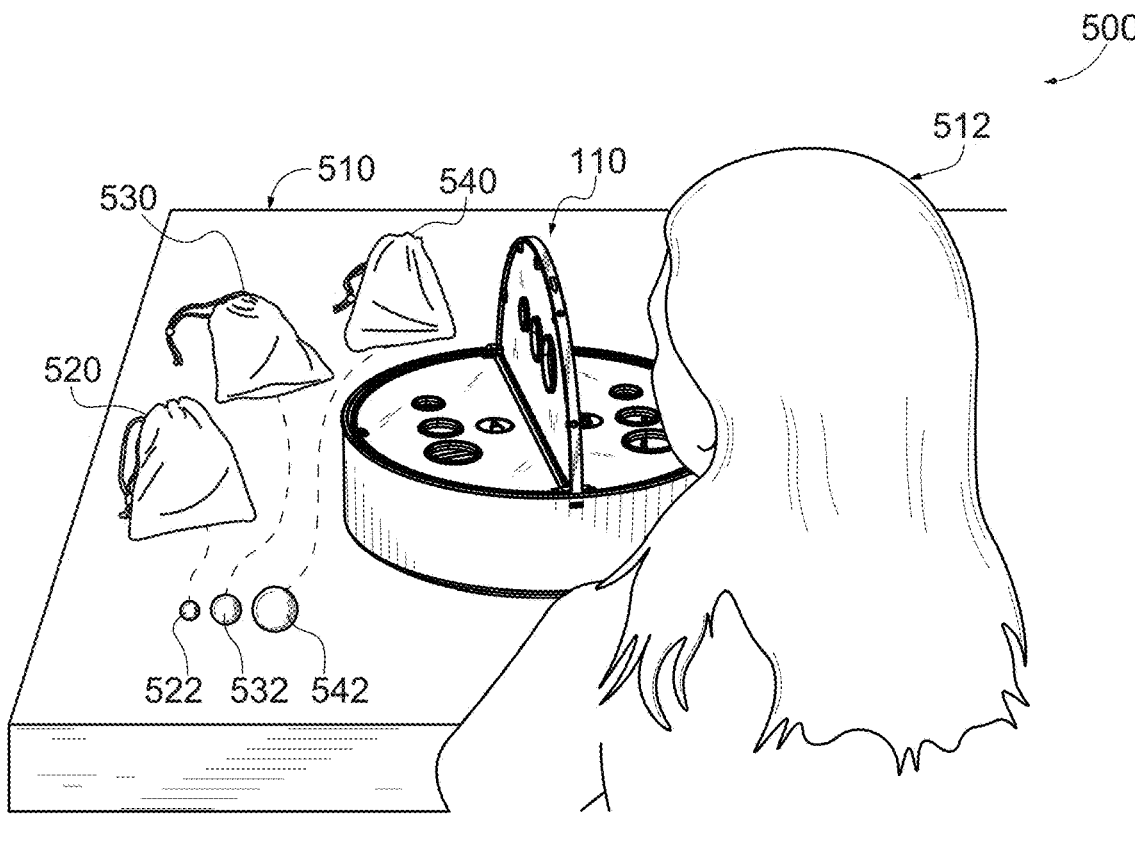
FIG. 5 illustrates a perspective view of the dexterity training device positioned on a worksurface with a user and various marble storage components.

FIG. 5 illustrates a perspective using view 500 showing a dexterity training device 110 positioned on a worksurface 510 with a user 512 engaged in therapeutic training exercises. The worksurface 510 may provide a stable platform for the dexterity training device 110, allowing the user 512 to maintain proper positioning during training sessions. The device 110 may be configured with a container 120 having a diameter of approximately twelve inches, providing an appropriate working area for manual dexterity exercises while maintaining portability for home or clinical use.

The partition height disclosed in the configuration may engage multiple muscle groups including hand, wrist, elbow, and shoulder muscles during object manipulation exercises. The partition height may be specifically dimensioned to require the user 512 to lift objects over the central vertical divider 130, thereby promoting coordinated movement across the entire upper extremity kinetic chain. This elevation requirement may facilitate therapeutic benefits by encouraging proper biomechanical patterns and muscle activation sequences during fine motor skill training.

In an illustrative configuration, the dexterity training device 110 may be used in conjunction with various storage containers for progressive training protocols. A small-marble bag 520 may contain a small marble 522 (also referred to as small marble 610, FIG. 6) configured for advanced dexterity challenges requiring precise finger control. Additionally, a large-marble bag 540 may house a large marble 542 designed for introductory training exercises where gross motor coordination takes precedence over fine motor precision. A medium marble 532 (also referred to as medium marble 710, FIG. 7) may provide intermediate difficulty levels, bridging the gap between basic and advanced training protocols.

The marble storage system may facilitate structured progression through increasing levels of difficulty during therapeutic sessions. The small-marble bag 520 may be utilized when the user 512 demonstrates proficiency with larger objects, as the small marble 522 requires enhanced finger dexterity and precision grip patterns. Conversely, the large-marble bag 540 may serve as the starting point for users with compromised motor function, as the large marble 542 accommodates reduced grip strength and coordination deficits. The medium marble 532 may provide transitional training opportunities, allowing gradual advancement in motor skill complexity while maintaining achievable therapeutic goals for the user 512 positioned at the worksurface 510.

Figure 6:
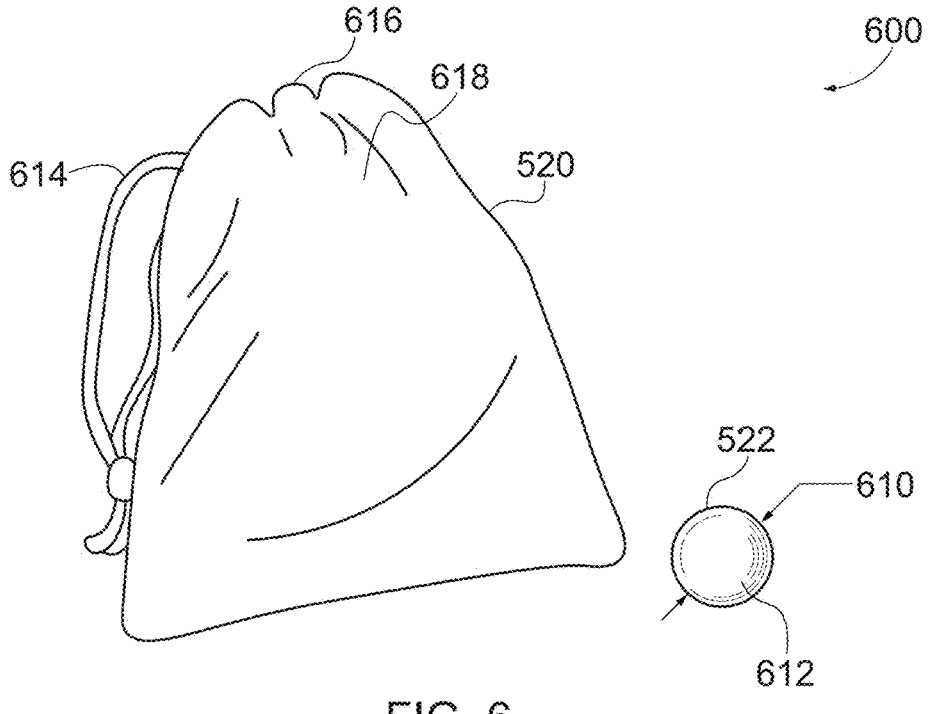
FIG. 6 illustrates a view of a small-marble storage bag with dimensional and color specifications.

FIG. 6 illustrates a view of a small-marble storage 600 that may be configured to contain and organize the smallest objects used in the dexterity training device 110. The small-marble storage 600 may include a small-marble bag 520 that may be specifically designed to house a small marble 522 and additional small marbles of the same size and color specification. The small-marble bag 520 may feature a sack body 618 that may be constructed from a flexible material capable of containing multiple marbles while maintaining portability and ease of access during training sessions.

The small-marble bag 520 may include a sack opening 616 positioned at the upper portion of the sack body 618, which may allow users to insert and remove the small marble 522 as needed during dexterity exercises. A drawstring 614 may be integrated around the sack opening 616 to provide a secure closure mechanism that may prevent accidental spillage of the marbles while allowing convenient access when the drawstring 614 is loosened. The drawstring 614 may be pulled tight to close the sack opening 616 completely, thereby securing the contents within the sack body 618 during storage or transport of the dexterity training device 110.

In an illustrative configuration, the small marble 522 may be characterized by specific dimensional and aesthetic properties that may contribute to the therapeutic effectiveness of the training exercises. The marble diameter 610 may be approximately 16 millimeters, which may represent the smallest size in the progressive difficulty system of the dexterity training device 110. Additionally, the marble color 612 may be designated as blue, which may serve as a visual identifier that may help users quickly distinguish between different marble sizes during training sessions. The different marbles may have color-specific sizes, where the small marble 522 with the blue marble color 612 may correspond to the most challenging level of fine motor skill exercises due to the reduced surface area available for finger manipulation. This color-coding system may enhance cognitive engagement by requiring users to process both size and color information simultaneously, thereby providing additional neurological stimulation beyond the physical dexterity training aspects of the device.

Figure 7:
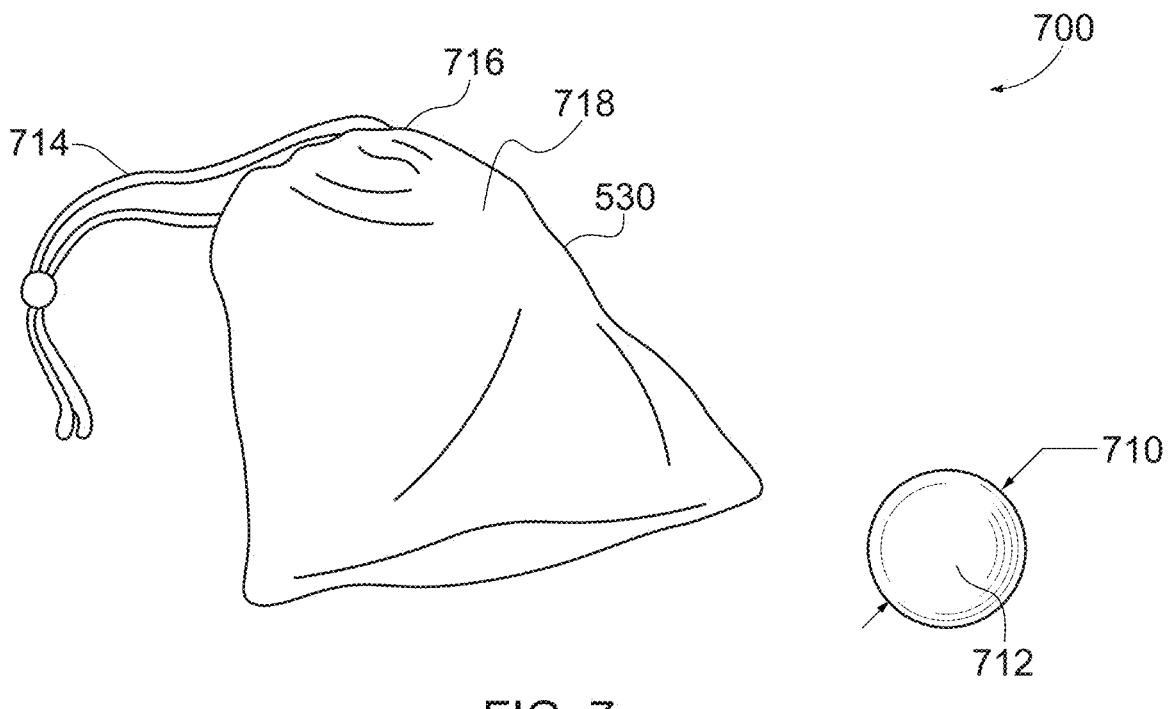
FIG. 7 illustrates a view of a medium-marble storage bag with dimensional and color specifications.

FIG. 7 illustrates a view of a medium-marble storage 700 that may be configured to contain and organize medium-sized therapeutic objects used with the manual dexterity training device 110. The medium-marble storage configuration may include a sack body 718 that forms the primary containment structure for the medium marbles 532. The sack body 718 may be constructed from a flexible material that allows for easy storage and transport of the medium marbles 532 while maintaining durability during repeated use in therapeutic applications.

The medium-marble storage 700 may include a sack opening 716 positioned at the upper portion of the sack body 718. The sack opening 716 may be configured to provide access for inserting and removing the medium marbles 532 during dexterity training exercises. A drawstring 714 may be integrated around the sack opening 716 to provide a secure closure mechanism. The drawstring 714 may allow users to tighten or loosen the sack opening 716 as needed, preventing accidental spillage of the medium marbles 532 while facilitating easy access during therapeutic sessions.

The medium marble 532 may define a marble diameter 710 that provides an intermediate level of therapeutic challenge between the smaller and larger marble sizes. In an illustrative configuration, the marble diameter 710 may measure approximately 25 millimeters, creating a size that requires moderate precision and control during manipulation exercises. The medium marble 532 may also include a marble color 712 designation that corresponds to the intermediate difficulty level. The marble color 712 may be purple, providing visual differentiation from other marble sizes and enabling users to quickly identify the appropriate therapeutic objects for their current skill level. This color-coding system may enhance cognitive function by requiring users to process visual information and make appropriate selections during dexterity training exercises.

Figure 8:
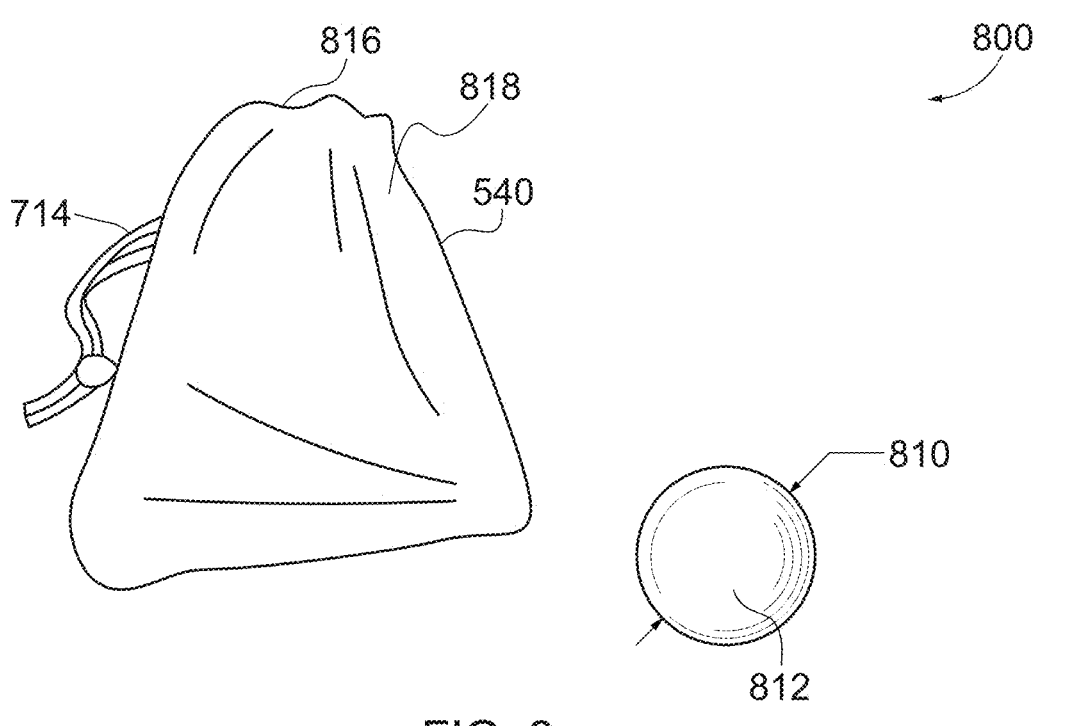
FIG. 8 illustrates a view of a large-marble storage bag with dimensional and color specifications.

FIG. 8 illustrates a view of a large-marble storage 800 showing a large-marble bag 540 configured to contain and organize the largest objects used with the dexterity training device 110. The large-marble bag 540 may include a sack body 818 with a sack opening 816 at an upper portion thereof. A drawstring 814 may be integrated around the sack opening 816 to secure the contents within the sack body 818. The marble diameter 810 and marble color 812 may be designated as approximately 35 mm and green, respectively, providing visual and tactile differentiation from the smaller marble configurations. The large marble 542 represents the beginner level of therapeutic training, allowing users with compromised motor function to build confidence and begin a path toward improved dexterity and independence. The large-marble storage configuration operates similarly to the medium and small marble storage systems, providing consistent organization and accessibility for the plurality of objects having different sizes used in the manual dexterity training device.

FIG. 9 illustrates a perspective of an easy path 900 showing the dexterity training device 110 configured for the most basic operational setup. The perspective of an easy path 900 demonstrates the foundational skill-level path where one of the cover-A 140A and cover-B 140B may be positioned in the horizontal position while the other is positioned in the vertical position, creating the simplest training configuration for users beginning therapeutic exercises. In this configuration, objects of varying sizes can pass directly over the central vertical divider 130 without requiring precise alignment through multiple openings in the central vertical divider 130. The marble path 910 illustrates the trajectory that objects follow when transferred between side-A and side-B of the container 120, providing a clear visual representation of the movement pattern users perform during basic dexterity exercises.

The marble path 910 disclosed in the perspective of an easy path 900 accommodates objects having different marble diameters, including marble diameter 610, marble diameter 710, and marble diameter 810. This configuration enables users with compromised motor function to begin therapeutic training by practicing fundamental movement patterns without the complexity of navigating through multiple aligned openings. The small marble 522, medium marble 532, and large marble 542 can all pass through the large hole 314, allowing users to select objects based on their current dexterity capabilities and gradually progress to smaller objects as motor skills improve.

In an illustrative configuration, the device may be designed for structured training sessions following a progressive task-based methodology described herein. The first skill-level path disclosed in the perspective of an easy path 900 provides a beginner difficulty level where one of the cover-A 140A and the cover-B 140B is positioned in the horizontal position while the other is positioned in the vertical position, and objects are moved over the central vertical divider 130 and the vertical cover. This beginner configuration enables users to build confidence through foundational movement patterns for dexterity restoration, establishing the basic motor coordination required for more advanced exercises. The training methodology may include structured 20-minute daily training sessions, six days per week, allowing users to develop consistent practice routines that support therapeutic outcomes.

The method for training manual dexterity may include providing the manual dexterity training device 110 and positioning objects in side-A of the container 120. Users can select a skill-level path from a plurality of available skill-level paths for moving objects from side-A to side-B, with the first skill-level path representing the most accessible option for individuals beginning rehabilitation or maintenance exercises. The device may be configured to provide progressive difficulty levels by selectively positioning the covers to create different skill-level paths for transferring objects between opposite sides of the container 120, with the basic configuration serving as the foundation for more complex training sequences.

FIG. 10 illustrates a perspective view of usage 1000 demonstrating a configuration of the dexterity training device 110. The perspective view of usage 1000 shows a marble path 1010 extending from the side-B to the site-A, where the large marble 810 may be transferred from one side of the container to the other. The marble path 1010 demonstrates the trajectory and movement pattern that users follow during dexterity training exercises.

The marble path 1010 demands enhanced hand-eye coordination and fine motor control. The marble path 1010 provides a controlled environment for users to practice transferring objects between compartments while developing the motor skills necessary for maintaining independence in daily activities such as buttoning clothing, handling utensils, or managing personal care tasks.

In an illustrative configuration, the skill-level path shown by the marble path 1010 may be particularly beneficial for individuals recovering from neurological conditions or age-related dexterity decline. The perspective view of usage 1000 demonstrates how the device 110 can be configured to provide graduated therapeutic challenges that promote neuroplasticity and motor learning. The marble path 1010 allows therapists and users to monitor progress as coordination improves, with the trajectory serving as a visual guide for proper movement patterns during rehabilitation exercises.

FIG. 11 illustrates a perspective view of first digit utilization 1100 demonstrating the fundamental motor training configuration of the manual dexterity training device. The perspective view of first digit utilization 1100 shows a hand 1102 positioned to manipulate a large marble 542 using specific finger combinations. The hand 1102 includes an index finger 1110 and a thumb 1112 working in coordination to grasp and control the large marble 542. This finger-specific training configuration targets precise motor pathways that may be compromised in individuals with neurological conditions or age-related dexterity decline. The thumb 1112 and index finger 1110 combination represents the most fundamental pincer grasp pattern used in daily living activities such as picking up small objects, writing, and manipulating tools.

The therapeutic importance of the thumb 1112 and index finger 1110 combination extends beyond basic motor function to address neuroplasticity and motor learning principles. When the hand 1102 engages the thumb 1112 and index finger 1110 to manipulate the large marble 542, the training may stimulate specific neural pathways associated with fine motor control. This targeted stimulation can promote cognitive benefits through the established connection between manual dexterity and cognitive function. The repetitive nature of moving objects through the device using the thumb 1112 and index finger 1110 may facilitate motor learning through practice-dependent neuroplasticity, where repeated motor tasks strengthen neural connections and improve motor performance over time.

The method of training manual dexterity may further include providing a plurality of objects having different sizes to create varying levels of difficulty. The central vertical divider may include a plurality of holes, with each hole sized to receive objects of different sizes. This configuration allows users to select objects and corresponding holes to create varying levels of difficulty based on their current motor abilities and therapeutic goals. The objects may include marbles having color-specific sizes, where the method further includes selecting marbles based on color to determine the appropriate hole size. This color-coding system may facilitate cognitive engagement by requiring users to process visual information and make appropriate motor responses, thereby combining cognitive and motor training elements. The restoration of daily living activities may be supported through this systematic approach to finger-specific training, as the thumb 1112 and index finger 1110 combination is fundamental to most activities of daily living requiring fine motor control.

FIG. 12 illustrates a perspective view of a second digit utilization 1200 wherein the hand 1102 demonstrates an advanced finger combination technique using the thumb 1112 and a middle finger 1210. The perspective view of a second digit utilization 1200 shows the hand 1102 grasping the medium marble 532, where the thumb 1112 and the middle finger 1210 work in coordination to manipulate the object through the dexterity training exercises. This finger combination may represent a progression in difficulty from the thumb and index finger pairing, as the middle finger 1210 requires greater independent control and coordination compared to the more naturally paired thumb and index finger combination.

The middle finger 1210 may be positioned to work in opposition with the thumb 1112, creating a pincer grip that can securely hold and manipulate the medium marble 532 during transfer exercises. This thumb and middle finger combination may challenge users to develop more refined motor control, as the middle finger 1210 operates with less natural dexterity than the index finger when paired with the thumb 1112. The configuration disclosed in the perspective view of a second digit utilization 1200 may promote neuroplasticity and motor learning by engaging different neural pathways and muscle groups than those used in basic thumb and index finger exercises.

In an illustrative configuration, the thumb 1112 and middle finger 1210 combination may be particularly beneficial for individuals recovering from neurological conditions or age-related motor decline, as this pairing requires enhanced concentration and deliberate motor planning. The medium marble 532 shown in the perspective view of a second digit utilization 1200 may provide an appropriate size challenge for this intermediate-level finger combination, being smaller than objects used for basic exercises but larger than those used for the most advanced training levels. Additionally, the thumb and middle finger coordination demonstrated in the perspective view of a second digit utilization 1200 may directly translate to improved performance in daily living activities such as buttoning clothing, handling utensils, or manipulating small objects that require precise finger control and coordination.

FIG. 13 illustrates a perspective of a third digit utilization 1300 wherein the manual dexterity training device 110 shows the small marble 522 being manipulated by the hand 1102. The hand 1102 includes the thumb 1112 and a ring finger 1310 holding the small marble 522. This finger combination represents a more challenging therapeutic exercise compared to the thumb-forefinger and thumb-middle finger pairings previously disclosed. The thumb 1112 and ring finger 1310 pairing may provide enhanced neurological benefits for individuals recovering from conditions such as Parkinson's disease, multiple sclerosis, and stroke recovery, as this finger combination requires greater neural coordination and fine motor control. The device 110 may be configured to support progressive training sessions where the movement of objects from side-A to side-B can be timed to measure dexterity improvement over multiple training sessions, allowing users and healthcare providers to track rehabilitation progress through quantifiable metrics.

FIG. 14 illustrates a perspective view of a fourth digit utilization 1400 wherein a hand 1102 demonstrates the most challenging finger combination for dexterity training exercises. The hand 1102 includes a pinky finger 1410 and a thumb 1112 grasping a medium marble 532, representing the highest level of fine motor skill difficulty within the progressive training system. This advanced finger-specific exercise may require users to coordinate the thumb 1112 with the pinky finger 1410, which typically exhibits the least independent motor control among the digits. The perspective view of a fourth digit utilization 1400 may support long-term independence and cognitive function maintenance by challenging users to develop precision movements that directly translate to activities of daily living, such as manipulating small objects, handling coins, or performing delicate tasks requiring fine motor coordination.

In an illustrative configuration, the method for training manual dexterity may include progressively increasing the difficulty level by moving from skill-level paths requiring fewer precision movements to skill-level paths requiring more precision movements. The progression from thumb and index finger combinations through thumb and middle finger, thumb and ring finger, and finally to the thumb and pinky finger 1410 combination may create a systematic approach to dexterity enhancement. This progressive difficulty structure may allow users to build confidence and motor skills gradually while addressing the natural hierarchy of finger dexterity capabilities, with the pinky finger 1410 representing the most challenging digit to coordinate with the thumb 1112 for precise object manipulation tasks.

FIG. 15 illustrates a perspective view of challenging utilization 1500 that demonstrates the most advanced configuration of the manual dexterity training device 110. In this configuration, both hands work simultaneously to transfer objects through aligned holes, representing bilateral coordination training that engages upper extremity coordination at the highest cognitive and motor challenge level. The perspective view of challenging utilization 1500 shows how a medium marble 532 may be transferred through multiple aligned passageways, requiring precise hand-eye coordination and bilateral motor control.

The bilateral coordination training disclosed in the perspective view of challenging utilization 1500 may require users to coordinate both hands simultaneously while maintaining proper grip strength and finger dexterity. This advanced training configuration may promote neural pathways that support activities of daily living, including buttoning shirts, tying shoelaces, and other self-care tasks that are fundamental for maintaining independence in aging populations. The perspective view of challenging utilization 1500 demonstrates how one hand may guide the medium marble 532 through the initial passageway while the opposite hand receives and directs the marble through subsequent aligned holes.

In an illustrative configuration, the bilateral coordination exercises shown in the perspective view of challenging utilization 1500 may engage multiple muscle groups simultaneously, including fine motor muscles in the fingers, gross motor muscles in the hands and wrists, and stabilizing muscles in the forearms and shoulders. The medium marble 532 may be transferred through a sequence of aligned holes that requires users to maintain spatial awareness while coordinating bilateral hand movements. This advanced training methodology may provide measurable improvements in cognitive function through the integration of motor learning exercises that challenge both hemispheres of the brain simultaneously.

The perspective view of challenging utilization 1500 may represent the culmination of progressive training levels, where users advance from basic unilateral movements to complex bilateral coordination tasks. The medium marble 532 may be manipulated through multiple passageways in a coordinated sequence that mirrors real-world activities requiring bilateral hand coordination. Additionally, the perspective view of challenging utilization 1500 may be particularly beneficial for individuals recovering from neurological conditions such as stroke, where bilateral coordination training can support neural plasticity and functional recovery. Moreover, this advanced configuration may serve as a maintenance tool for healthy individuals seeking to preserve cognitive and motor function as part of a comprehensive wellness program.

FIG. 16 illustrates a perspective of shoulder pain 1600 showing a user 1610 with a shoulder 1612 that may be experiencing discomfort or recovering from surgical intervention. The perspective of shoulder pain 1600 demonstrates the clinical context in which the manual dexterity training device 110 may provide therapeutic benefits for individuals with shoulder-related conditions. The user 1610 may represent patients who have undergone rotator cuff surgery, shoulder replacement procedures, or other orthopedic interventions that affect upper extremity function and range of motion.

The shoulder 1612 represents a complex joint structure that may be compromised due to various medical conditions or surgical procedures. Shoulder rehabilitation typically requires progressive exercises that gradually restore strength, flexibility, and coordination while avoiding excessive stress on healing tissues. The manual dexterity training device 110 may address these therapeutic needs by providing controlled movement patterns that engage the shoulder 1612 in functional activities. The device may facilitate graduated exercise progressions that can be adapted to different stages of recovery, from early post-operative phases through advanced rehabilitation protocols.

In an illustrative configuration, the manual dexterity training device 110 may serve as a therapeutic tool for addressing the medical significance of shoulder rehabilitation in maintaining independence and quality of life. Shoulder-related conditions can significantly impact an individual's ability to perform activities of daily living, including personal care, household tasks, and occupational functions. The user 1610 may benefit from the device's ability to provide structured exercises that promote neuromuscular re-education and functional movement patterns. Additionally, the device may help restore confidence in upper extremity use while providing measurable progress indicators for both patients and healthcare providers.

FIG. 17 illustrates a perspective view of shoulder training 1700 showing an advanced therapeutic configuration of the manual dexterity training device 110. The shoulder bracket 1710 may be removably attachable to the central vertical divider 130, expanding the device's therapeutic applications beyond fine motor skills to include upper body strength and range of motion exercises. The shoulder bracket 1710 may be configured to promote muscle training by creating an elevated marble pathway 1712 that requires greater shoulder engagement during object transfer exercises.

The shoulder bracket 1710 may utilize a magnetic attachment system that allows the bracket to be easily attached and removed by grip strength alone. The magnetic connection may provide sufficient stability during therapeutic exercises while maintaining the removable nature that allows users to customize their training experience. The shoulder bracket 1710 may be positioned to increase the partition height, thereby requiring users to engage shoulder muscles more extensively when transferring objects between the side-A and side-B of the container 120.

In an illustrative configuration, the marble pathway 1712 may be elevated above the standard transfer height, creating therapeutic benefits for individuals recovering from shoulder surgery or those seeking to maintain shoulder mobility. The elevated pathway may require users to lift objects higher than the standard configuration, engaging the deltoid, rotator cuff, and other shoulder muscle groups. The user 512 may perform rehabilitation exercises by transferring the medium marble 532 through the elevated marble pathway 1712, promoting recovery and strength building in the shoulder region.

The shoulder bracket 1710 may be particularly beneficial for individuals undergoing physical therapy following rotator cuff surgery, shoulder replacement, or other upper extremity procedures. The progressive nature of the training may allow users to gradually increase their range of motion and strength as recovery progresses. Referring to FIG. 5, the dexterity training device 110 may be positioned on a worksurface 510 for regular use by a user 512. The configuration disclosed herein addresses the growing concern of age-related cognitive decline and motor skill deterioration that affects millions of individuals worldwide. Research indicates that fine motor skills and cognitive function are interconnected, with decline in one area often contributing to decline in the other. The manual dexterity training device 110 provides a structured approach to maintaining and improving these interconnected capabilities through consistent daily practice.

The device 110 may be used for, as an illustrative example, twenty minutes daily to provide measurable benefits in maintaining cognitive function and motor skills. Regular engagement with the dexterity training exercises disclosed herein can help users maintain independence in daily activities such as buttoning clothing, writing, cooking, and other tasks that require precise hand-eye coordination. The progressive difficulty levels incorporated into the device 110 allow users to gradually challenge their motor skills and cognitive processing abilities, potentially slowing or preventing the decline commonly associated with aging or neurological conditions.

In an illustrative configuration, the daily exercise routine using the device 110 may include transferring objects between the side-A and side-B compartments using various finger combinations and skill-level paths. This consistent practice can stimulate neural pathways associated with fine motor control and cognitive processing. The structured progression from simple to complex movements may help maintain neuroplasticity, which is the brain's ability to form new neural connections throughout life. Additionally, the color-coding system and size variations of the objects provide cognitive challenges that can help maintain mental acuity and processing speed.

The importance of consistent daily use cannot be overstated, as motor skills and cognitive abilities follow a "use it or lose it" principle. The device 110 provides an accessible and engaging method for individuals to proactively address potential decline before significant impairment occurs. Furthermore, the device 110 may be particularly beneficial for individuals recovering from stroke, managing Parkinson's disease, multiple sclerosis, or other conditions that affect fine motor control and cognitive function. The structured exercise program disclosed herein offers a non-pharmaceutical intervention that can complement traditional rehabilitation therapies and provide long-term benefits for maintaining independence and quality of life.

In one configuration, the dexterity training device 110 has instructions that organizes a training system into three progressive levels, each containing a defined series of tasks designed to develop fine motor control, bilateral coordination, and upper extremity strength. Level 1, which includes Tasks 1 through 16, focuses on building basic hand dexterity through repetitive, single-hand exercises using colored marbles of varying sizes. In this stage, the user performs sequential transfers of marbles from one side of the apparatus to the other, alternating between the right and left hands. Tasks 1 through 4 employ large green marbles, Tasks 5 through 8 use medium purple marbles, and Tasks 9 through 12 utilize small blue marbles. Tasks 13 through 16 then combine all marble sizes in a set of complex dexterity exercises, requiring the user to manipulate mixed marbles across the center divider with precision. These activities establish foundational motor coordination and prepare the user for more advanced exercises.

The instructions of the dexterity training device 110 may further organize the training system by including Level 2 with Tasks 17 through 64 which advances the training by isolating specific finger combinations to enhance fine motor precision and digital strength. The exercises are performed with both the right and left hands, using marbles of all three sizes, but require that each transfer be executed using only designated pairs of digits. Tasks 17 through 28 employ the thumb and forefinger; Tasks 29 through 40 utilize the thumb and middle finger; Tasks 41 through 52 use the thumb and ring finger; and Tasks 53 through 64 employ the thumb and little finger. Each group of exercises follows the same progressive format as Level 1 but increases difficulty by demanding greater finger isolation and fine muscular control. This level systematically develops finger coordination, tactile sensitivity, and neuromuscular precision through repetitive, structured motion patterns.

The instructions of the dexterity training device 110 may further organize the training system by including Level 3, which includes Tasks 65 through 72, that introduces bilateral coordination and upper limb engagement. In this phase, both hands are used simultaneously to transfer marbles through the central structure, requiring the user to coordinate hand movements in unison. Tasks 65 through 70 focus on coordinated two-hand movements using the same marble sizes as in previous levels. Task 71 incorporates a shoulder bracket that elevates the range of motion, thereby engaging and strengthening the shoulder and upper arm muscles. Task 72 presents additional variations, encouraging the user to modify the exercises by introducing timing elements, performing transfers with eyes closed, or experimenting with alternative finger combinations. Through these progressive stages, the dexterity training device 110 provides a structured training program that incrementally improves manual dexterity, hand-eye coordination, and upper extremity control while reinforcing cognitive engagement and fine motor independence.

The methods, systems, devices, graphs, and/or tables are illustrative examples, and configurations may omit, substitute, or add various procedures or components as appropriate. For instance, the methods may be reordered in alternative configurations, and/or various stages may be added, omitted, and/or combined. Alternatively, features described with respect to certain configurations may be in various alternative configurations. Different aspects and elements of the configurations may be combined similarly. Also, technology evolves; thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or +0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or +0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent more than one occurrence or use of the items A, B, or C is possible, multiple uses of A, B, and/or C may form part of the contemplated combinations. For example, a list of "at least one of A, B, and C" may include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been provided in connection with specific apparatuses and methods, it is to be clearly understood that this description is made only by way of example and not as a limitation on the scope of the disclosure.

What is claimed is:

1. A manual dexterity training device, comprising:
an object defining a shape and a size, the object configured to be manually moved;
a container configured to readily and removably store the object, the container comprising:
an open face;
a side-A; and
a side-B,
wherein the side-A and the side-B are configured to be accessed through the open face;
a central vertical divider positioned within the container and separating the side-A from the side-B, the central vertical divider comprising:
a face-A adjacent to the side-A of the container;
a face-B parallel to and offset from the face-A, and the face-B adjacent to the side-B of the container;
an in-container section;
a protruding section adjoining the in-container section and extending from the container adjacent to the open face; and
at least a first hole formed in the protruding section and extending through the face-A and the face-B, the first hole configured to passingly receive the object;
a cover-A hingedly coupled to either: the face-A of the central vertical divider or to the container, the cover-A being configured to move between a horizontal position and a vertical position, the cover-A comprising:
at least a second hole extending through the cover-A and configured to passingly receive the object,
wherein the cover-A is coplanar to the open face of the container in the horizontal position, and
wherein at the vertical position, the second hole is aligned to the first hole of the central vertical divider;
a cover-B hingedly coupled to either: the face-B of the central vertical divider or to the container, the cover-B configured to move between a horizontal position and a vertical position, the cover-B comprising:
at least a third hole extending through the cover-B and configured to passingly receive the object,
wherein the cover-B is coplanar to the open face of the container in the horizontal position, and
wherein at the vertical position, the third hole is aligned to the first hole of the central vertical divider;
wherein the object is stored in the side-A and readily movable to the side-B by passing through the first hole formed in the central vertical divider, the second hole formed in the cover-A and the third hole formed in the cover-B, and
wherein the cover-A and cover-B are independently positionable to create multiple skill-level paths for transferring objects between the side-A and side-B.

2. The device of claim 1, wherein the container comprises a circular bowl.

3. The device of claim 1, wherein the central vertical divider is removably positioned within the container.

4. The device of claim 3, wherein the central vertical divider snaps into position within the container.

5. The device of claim 1 and further comprising:
a second object that is larger than the object; and
at least a fourth hole extending through the face-A and the face-B of the central vertical divider, the fourth hole configured to passingly receive the second object.

6. The device of claim 5, wherein:
the first hole defines a first-hole diameter; and
the fourth hole defines a fourth-hole diameter that is larger than the first-hole diameter.

7. The device of claim 5, wherein the object and the second object are different marbles.

8. The device of claim 7, wherein the different marbles have color-specific sizes.

9. The device of claim 1, wherein the second hole in the cover-A and the third hole in the cover-B are color-coded to correspond with the object.

10. The device of claim 1, wherein the cover-A and the cover-B are magnetically held in the horizontal position and the vertical position.

11. The device of claim 1, further comprising a shoulder bracket removably attachable to the central vertical divider, wherein the shoulder bracket is configured to promote shoulder mobility.

12. The device of claim 1, further comprising sound dampening pads positioned within the container.

13. The device of claim 1, wherein the container has a diameter of approximately twelve inches.

14. A method for training manual dexterity, comprising:
providing a manual dexterity training device comprising:
an object defining a shape and a size;
a container configured to readily and removably store the object, the container comprising an open face, a side-A, and a side-B;
a central vertical divider positioned within the container and separating the side-A from the side-B, the central vertical divider comprising a face-A, a face-B parallel to and offset from the face-A, and at least a first hole extending through the face-A and the face-B, the first hole sized to passingly receive the object;
a cover-A hingedly coupled to either the face-A of the central vertical divider or to the container, the cover-A being configured to move between a horizontal position and a vertical position, the cover-A comprising at least a second hole extending therethrough and sized to passingly receive the object; and
a cover-B hingedly coupled to either the face-B of the central vertical divider or to the container, the cover-B configured to move between a horizontal position and a vertical position, the cover-B comprising at least a third hole extending therethrough and sized to passingly receive the object;
positioning the object in the side-A of the container;
selecting a skill-level path from a plurality of available skill-level paths for moving the object from the side-A to the side-B; and
moving the object from the side-A to the side-B through the selected skill-level path.

15. The method of claim 14, wherein the plurality of available skill-level paths comprises:
a first skill-level path wherein the cover-A is positioned in the horizontal position, and the object is moved over the central vertical divider; and
a second skill-level path wherein the cover-A is positioned in the vertical position with the second hole aligned to the first hole, the cover-B is positioned in the horizontal position, and the object is moved through the second hole and the first hole.

16. The method of claim 15, wherein the first skill-level path provides a beginner difficulty level, and the second skill-level path provides an intermediate difficulty level.

17. The method of claim 14, further comprising:

providing a plurality of objects having different sizes;

providing a plurality of holes in the central vertical divider, each hole sized to receive objects of different sizes; and selecting objects and corresponding holes to create varying levels of difficulty.

18. The method of claim 17, wherein the objects comprise marbles having color-specific sizes, and the method further comprises selecting marbles based on color to determine the appropriate hole size.

19. The method of claim 14, further comprising timing the movement of the object from the side-A to the side-B to measure dexterity improvement over multiple training sessions.

20. The method of claim 14, further comprising progressively increasing the difficulty level by moving from skill-level paths requiring fewer precision movements to skill-level paths requiring more precision movements.

21. A manual dexterity training device, comprising:

a container having an open face and defining a side-A and a side-B;

a central vertical divider positioned within the container and separating the side-A from the side-B, the central vertical divider comprising a face-A, a face-B parallel to and offset from the face-A, and at least one hole extending through the face-A and the face-B;

a cover-A hingedly coupled to the central vertical divider and configured to move between a horizontal position coplanar with the open face and a vertical position, the cover-A comprising at least one hole sized to align with the hole in the central vertical divider when in the vertical position;

a cover-B hingedly coupled to the central vertical divider and configured to move between a horizontal position coplanar with the open face and a vertical position, the cover-B comprising at least one hole sized to align with the hole in the central vertical divider when in the vertical position;

wherein the cover-A and the cover-B are independently positionable to create multiple skill-level paths for transferring objects between the side-A and the side-B, including:

a first skill-level path with both covers in horizontal positions allowing direct passage through the central vertical divider hole; and a second skill-level path with one cover in vertical position and one cover in horizontal position requiring passage through two aligned holes.

22. A manual dexterity training device, comprising:

a circular container having an open face and configured to receive objects for dexterity training;

a central vertical divider removably positioned within the container, the central vertical divider comprising:

a face-A and a face-B positioned parallel to each other;

a plurality of holes extending through both the face-A and the face-B, wherein each hole has a different diameter corresponding to objects of different sizes;

a protruding section extending above the open face of the container;

a pair of hingedly coupled covers, each cover movable between a horizontal position coplanar with the open face and a vertical position perpendicular to the open face, each cover comprising holes corresponding in size and position to the holes in the central vertical divider;

a plurality of objects having different sizes, each object sized to pass through a corresponding hole in the central vertical divider and covers;

wherein the objects are color-coded according to size, and the holes in the covers are color-coded to match the corresponding objects, wherein the covers are magnetically retained in both the horizontal position and the vertical position;

wherein the device is configured to provide progressive difficulty levels by selectively positioning the covers to create different skill-level paths for transferring objects between opposite sides of the container.

\*    \*    \*    \*    \*